(12) United States Patent
Ayyadurai

(10) Patent No.: US 6,718,368 B1
(45) Date of Patent: Apr. 6, 2004

(54) SYSTEM AND METHOD FOR CONTENT-SENSITIVE AUTOMATIC REPLY MESSAGE GENERATION FOR TEXT-BASED ASYNCHRONOUS COMMUNICATIONS

(75) Inventor: V. A. Shiva Ayyadurai, Belmont, MA (US)

(73) Assignee: General Interactive, Inc., Cambridge, MA (US)

( * ) Notice: Subject to any disclaimer, the term of this patent is extended or adjusted under 35 U.S.C. 154(b) by 0 days.

(21) Appl. No.: 09/325,111

(22) Filed: Jun. 3, 1999

Related U.S. Application Data

(63) Continuation-in-part of application No. 09/323,312, filed on Jun. 1, 1999.

(51) Int. Cl.[7] .............................................. G06F 15/16
(52) U.S. Cl. ..................... 709/206; 715/500.1; 715/531; 709/204; 709/207; 706/12; 706/45; 706/47; 707/1; 704/1
(58) Field of Search .............................. 709/206, 207, 709/204; 345/733; 370/260; 379/93.01; 707/1, 6; 706/12, 45, 47; 704/1; 715/500.1, 531

(56) References Cited

U.S. PATENT DOCUMENTS

| | | | | |
|---|---|---|---|---|
| 5,283,856 A | * | 2/1994 | Gross et al. ................... 706/45 |
| 5,598,557 A | * | 1/1997 | Doner et al. ................. 345/835 |
| 5,734,903 A | * | 3/1998 | Saulpaugh et al. ......... 709/238 |
| 5,884,248 A | * | 3/1999 | Hall ........................... 340/7.21 |
| 6,029,195 A | * | 2/2000 | Herz ............................ 707/10 |
| 6,044,205 A | * | 3/2000 | Reed et al. ..................... 707/1 |
| 6,047,277 A | * | 4/2000 | Parry et al. .................... 706/14 |
| 6,085,201 A | * | 7/2000 | Tso ............................. 707/505 |
| 6,122,632 A | * | 9/2000 | Botts et al. ..................... 705/1 |
| 6,161,130 A | * | 12/2000 | Horvitz et al. .............. 709/206 |
| 6,182,059 B1 | * | 1/2001 | Angotti et al. ................ 706/45 |
| 6,278,996 B1 | * | 8/2001 | Richardson et al. ........... 707/6 |
| 6,301,608 B1 | * | 10/2001 | Rochkind ................ 379/93.24 |
| 6,356,633 B1 | * | 3/2002 | Armstrong ............. 379/265.11 |
| 6,356,936 B1 | * | 3/2002 | Donoho et al. ............. 709/206 |
| 6,411,947 B1 | * | 6/2002 | Rice et al. ..................... 706/47 |
| 6,477,551 B1 | * | 11/2002 | Johnson et al. ............. 715/531 |
| 6,515,681 B1 | * | 2/2003 | Knight ........................ 345/751 |

\* cited by examiner

*Primary Examiner*—Kenneth R. Coulter
*Assistant Examiner*—Hai V. Nguyen
(74) *Attorney, Agent, or Firm*—Burns Doane Swecker & Mathis, LLP

(57) ABSTRACT

A process and system is disclosed for automatically and adaptively retrieving information from a database and transmitting reply messages based on the content of a received message, such as an e-mail, CGI form, or facsimile document. In one step of the process, an enhanced e-mail editor user interface is employed to display the original message, the system's adaptive analysis results, and the automatically generated reply message so that a user may review the reply, modify the analysis results, and modify the reply message. The process then learns the changes indicated, and updates the adaptive analysis steps which analyze the received messages. In so doing, future reply messages are increasingly more accurate and correct. After the is adaptive algorithms have been sufficiently trained through the user intervention and correction step, the process and system disclosed is capable of fully autonomous reply generation and transmission.

6 Claims, 4 Drawing Sheets

SYSTEM AND METHOD FOR CONTENT-SENSITIVE AUTOMATIC REPLY MESSAGE GENERATION FOR TEXT-BASED ASYNCHRONOUS COMMUNICATIONS

CROSS-REFERENCE TO RELATED APPLICATIONS

CLAIMING BENEFIT UNDER 35 U.S.C. 120

This application is a continuation-in-part of U.S. application Ser. No. 09/323,312, filed on Jun. 1, 1999, by V. A. Shiva Ayyadurai.

FEDERALLY SPONSORED RESEARCH AND DEVELOPMENT STATEMENT

This invention was not developed in conjunction with any Federally sponsored contract.

MICROFICHE APPENDIX

Not applicable.

TECHNICAL FIELD OF THE INVENTION

This invention pertains to the arts of automatic analysis, classification, characterization, routing and response to text-based messages in electronic asynchronous messaging systems, and especially to electronic mail and facsimile systems.

INCORPORATION BY REFERENCE

The above referenced application Ser. No. 09/323,312, filed on Jun. 1, 1999, by V. A Shiva Ayyadurai, is incorporated herein by reference in its entirety, including drawings, and hereby is made a part of this application.

BACKGROUND OF THE INVENTION

Electronic mail and facsimile ("fax") messaging have become critical tools of everyday personal and business life. Most corporations, government agencies, organizations, and institutions have established fax numbers and e-mail addresses for a wide variety of contact purposes, including requesting information such as literature and office locations from the entity, requesting investment information, requesting service on or technical support for a product, reporting a product problem or failure, submitting suggestions for products and service improvements, submitting complimentary comments, and in some cases, carrying on dialogues with personalities and celebrities associated with the entity. Fax and email messaging have converged in electronic form, as messages originating in the form of fax are commonly captured by computers with fax/modem interfaces and optically converted to text files, and as many services offer low cost fax message delivery via e-mail-based interfaces.

Underlying the tremendous proliferation of fax and email are several factors, including wide-spread availability of inexpensive e-mail clients such as personal computers, and inexpensive fax machines, and the development of common standards for exchange of electronic text messages between computers, including RFC821 Simple Mail Transfer Protocol ("SMTP") from the Internet Network Information Center, and Recommendation X.400 from the International Telecommunications Union ("ITU").

Consequently, corporations, government agencies, and other entities which successfully promote the availability of their fax telephone numbers and e-mail addresses can receive thousands to tens-of-thousands of messages per day.

Traditionally, all of the electronic messages are received in a general repository, or "mailbox", and reviewed by human agents for their content, intent, at which time a determination of the correct disposition of the email is made. This may involve sending the author a standard reply, and/or copying or forwarding the e-mail to one or more divisions, departments, or individuals within the organization for further handling. In the later case where multiple parties must be consulted, the consolidation of replies from all of the parties can be cumbersome and overwhelming, given the volume of messages to be handled.

For example, assume a company receives five thousand messages per day. Further assume that on average each one of those messages contains issues or requests that involve an average of 3 departments or individual. The original message must be read once by the reviewing agent who forwards the message to the 3 individuals or departments. The receiving departments may read the forwarded message one to three times per department before it reaches the person who can respond. In total, 5,000 received e-mails may result in up to 20,000 to 50,000 reviews of the messages within the company. In many cases, the final recipient may need to instigate a short dialogue over several message exchanges with the author to ascertain exactly what the author needs or how the author can be serviced. Consequently, a daily volume of 5,000 new messages may reasonably result in a total network volume and work load of tens-of-thousands to a hundred-thousand messages per day.

To deal with this volume of messages and to attempt to provide a timely response to these messages, some systems have been developed which allow the human reviewer to combine and create or select a response from libraries of standard responses. For example, FIG. 1 shows a prior art method wherein a customer for a company creates an initial message using an e-mail viewer and editor (1), and transmits (2) that message into an e-mail routing system (3). The corporation will receive (4) the message and an agent will read it using another e-mail viewer and editor (5). As the agent manually analyzes the message content (7), he or she may search (8) a file or database (15) which contains text replies to the most commonly asked questions. The agent then selects one or more of the text replies, uses a "cut and paste" user interface function (11) to compose the basis for an e-mail reply, composes the remainder of the reply (that which is not drawn from the database or not provided for by the database), and sends (12) that message back to the customer via the e-mail routing system (3) using the e-mail view and editor (5) send or reply function. Finally, the customer may receive his or her reply by retrieving (14) the message from the e-mail routing system (3), and reading it with his or her e-mail viewer (1). This "cut and paste" method can reduce the amount of labor required to respond to only a low percentage of the messages received as the database will contain answers only to commonly asked questions. Complicated questions and follow-up messages may not be able to be handled by this method, so ultimately, some percentage of these messages are not handled with this method and are transferred or forwarded to one or more recipients for manual disposition.

For example, a typical two-issue email is given in TABLE 1.

TABLE 1

Typical Two-Issue Email

| To: | info@xyzcorp.com |
|---|---|
| FROM: | john_customer@an_isp.net |
| SUBJECT: | Model 999 of your product and your service centers |
| MESSAGE: | Please send me the technical specs for your Model 999 widget, especially the standard battery life. And, if it breaks, where is the closest service center to my home town, Smithville, or do I have to ship it back to you for repair? Thanks, John. |

Using the method of FIG. 1, an agent would search the sample responses for the response to the first issue, the request for technical specifications, and would cut and paste the following text into a new or reply e-mail, as shown in TABLE 2.

TABLE 2

First Cut and Paste for Reply

| To: | john_customer@an_isp.net |
|---|---|
| FROM: | info@xyzcorp.com |
| SUBJECT: | Re: Model 999 of your product and your service centers |
| MESSAGE: | "The Model 999 typically operates for up to 4 hours between battery charges". |

Then, the agent would search for a response to the second issue, the request for the nearest service center, and would paste text into the message as shown in TABLE 3.

TABLE 3

First Cut and Paste for Reply

| To: | john_customer@an_isp.net |
|---|---|
| FROM: | info@xyzcorp.com |
| SUBJECT: | Re: Model 999 of your product and your service centers |
| MESSAGE: | Dear John, The Model 999 typically operates for up to 4 hours between battery charges. "Bob's Hardware Store, 19 Main Street, Smithville, Telephone: 1-800-999-8888." |

Finally, the agent would complete the composition by adding connective text to complete a comprehendible message, as shown in TABLE 4.

TABLE 4

Final Edit for Reply

| To: | john_customer@an_isp.net |
|---|---|
| FROM: | info@xyzcorp.com |
| SUBJECT: | Re: Model 999 of your product and your service centers |
| MESSAGE: | Dear John, Thank you for your recent message. To answer your first question, the Model 999 typically operates for up to 4 hours between battery charges. As for your second question, your closest authorized repair facility is Bob's Hardware Store, 19 Main Street, Smithville, Telephone: 1-800-999-8888. I hope this has provided the answers you need, but if not, please feel free to contact us again. Best Regards, Suzy, Customer Service Agent 19. |

If some of the issues presented by the initial message from the customer are not provided for by the sample reply database, the agent may need to manually forward the message to one or more specialists or departments, finally merging their replies with other sample replies.

FIG. 2 shows a slightly more advanced method in the prior art, whereby the e-mail is received from the customer to an agent's e-mail viewer and editor (5) in the same manner as described above and shown in FIG. 1. However, a database of entire message responses (22) is available for the agent to simply select to be sent to the customer. The agent manually browses or searches the library of standard replies (22) using an index (21), and the reply message or messages is automatically sent based on the agent's selection. Using this method, the time required to cut and paste a new reply and to complete the message is eliminated as each reply contained in the library is a complete reply in and of itself, and the issues not provided for in the library may be handled separately. For example, the two issues presented in the message of TABLE 1 could be handled with two separate messages, as shown in TABLE 5 and TABLE 6, both selected from the library of standard complete replies.

TABLE 5

Reply to First Issue

| To: | john_customer@an_isp.net |
|---|---|
| FROM: | info@xyzcorp.com |
| SUBJECT: | Model 999 Specifications |
| MESSAGE: | Thank you for your recent message. Here are the specifications for the Model 999: Weight: 10 lbs. Safety: UL-approved Color: Safety Yellow Battery Life: Standard 4 hour operation between charges, optional extended life battery provides up to 10 hours operation. We appreciate your interest in our products, Sincerely, the XYZ Customer Response Center. |

TABLE 6

Reply for Second Issue

| To: | john_customer@an_isp.net |
|---|---|
| FROM: | info@xyzcorp.com |
| SUBJECT: | Service Centers |
| MESSAGE: | Thank you for your recent message. A current listing of service centers across the country can be found on our website at: www.xyzcorp.com/service_locations.htm |

While this second method reduces the labor to generate the reply, it has several disadvantages. The first of which is the fact that the customer received multiple replies for a single message. The second is that the messages miss the "human touch" and are obviously "canned" because they contain no information which is personal to the customer, such as addressing him by name. Also, the second reply does not actually answer his question, but refers him to the source for his answer. Finally, for any issues presented in the message for which no standard reply is available in the library, a third message reply may be sent to the customer by a specialist.

Therefore, there exists a need in the art for an automated reply system and method which intelligently composes a preliminary response to a message which may contain one or more issues or requests.

Further, there exists a need in the art for this automated reply system to use conventional technology and techniques which find practical application to the analysis of free-form written speech.

Additionally, there exists a need in the art for this system to allow a human agent to review, correct, modify, or cancel a proposed reply.

Still further, there exists a need for this system to be capable of autonomous message composition and replying without need for human agent intervention.

BRIEF DESCRIPTION OF THE DRAWINGS

For a more complete understanding of the invention, the following disclosure can be taken in conjunction with the presented figures.

SUMMARY OF THE INVENTION

An object of the invention disclosed herein is to provide an automated system composing reply messages to electronic text-based messages within an asynchronous communications system.

The system and method disclosed intelligently composes a preliminary response to a message which may contain one or more issues or requests. The system is comprised of conventional technology and techniques which are practical applications of analysis of free-form written speech.

The preliminary response is presented to a user interface, which allows a human agent to review, correct, modify, or cancel a proposed reply.

In an optimal embodiment or mode of operation, this system is capable of autonomous message composition and replying without need for human agent intervention.

DETAILED DESCRIPTION OF THE INVENTION

The following disclosure, when taken in conjunction with the presented figures, sets forth the invention which meets the objects of the invention set forth in the SUMMARY OF THE INVENTION.

Figure 1:
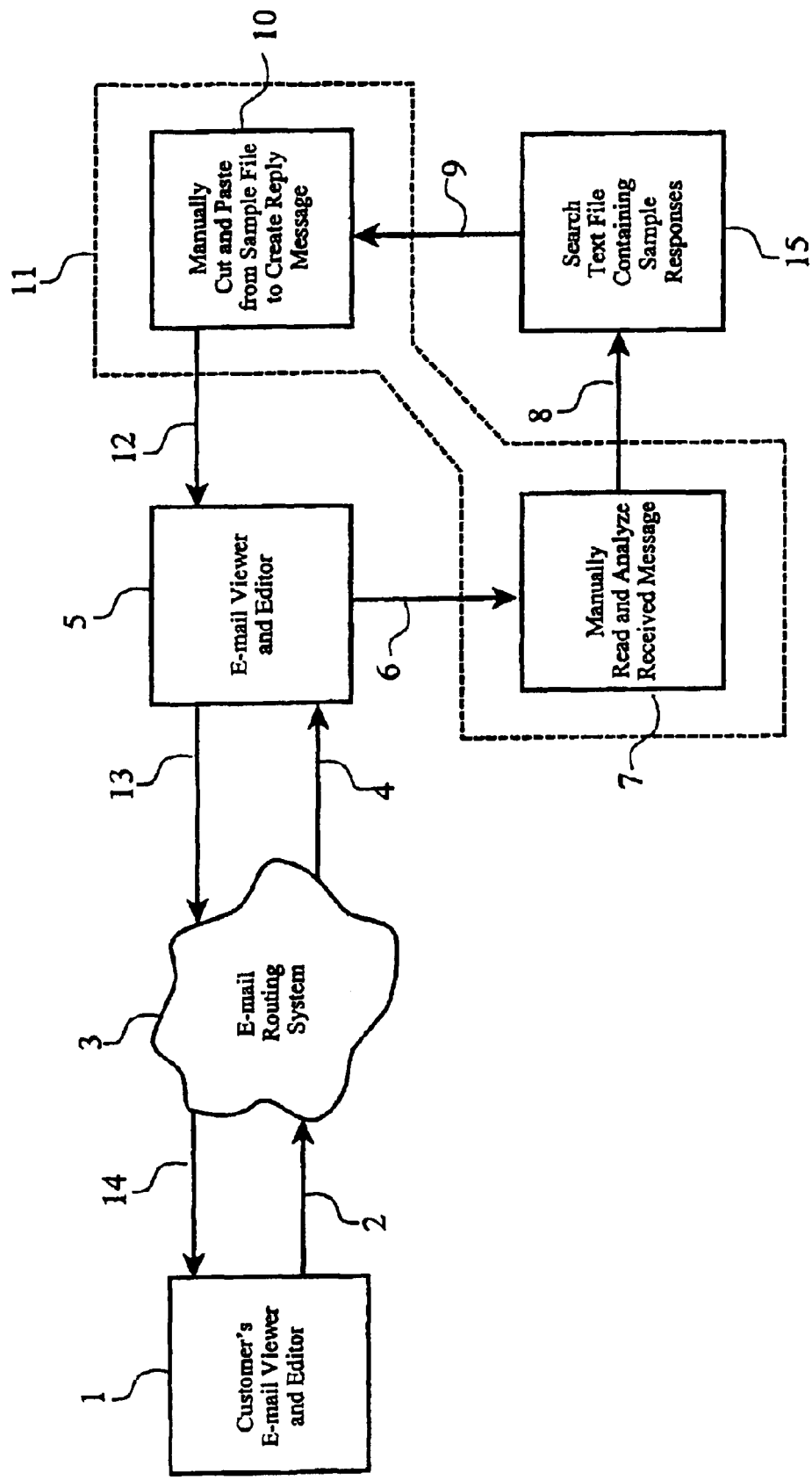
FIG. 1 shows one method of reviewing and composing replies to electronic messages.
Figure 2:
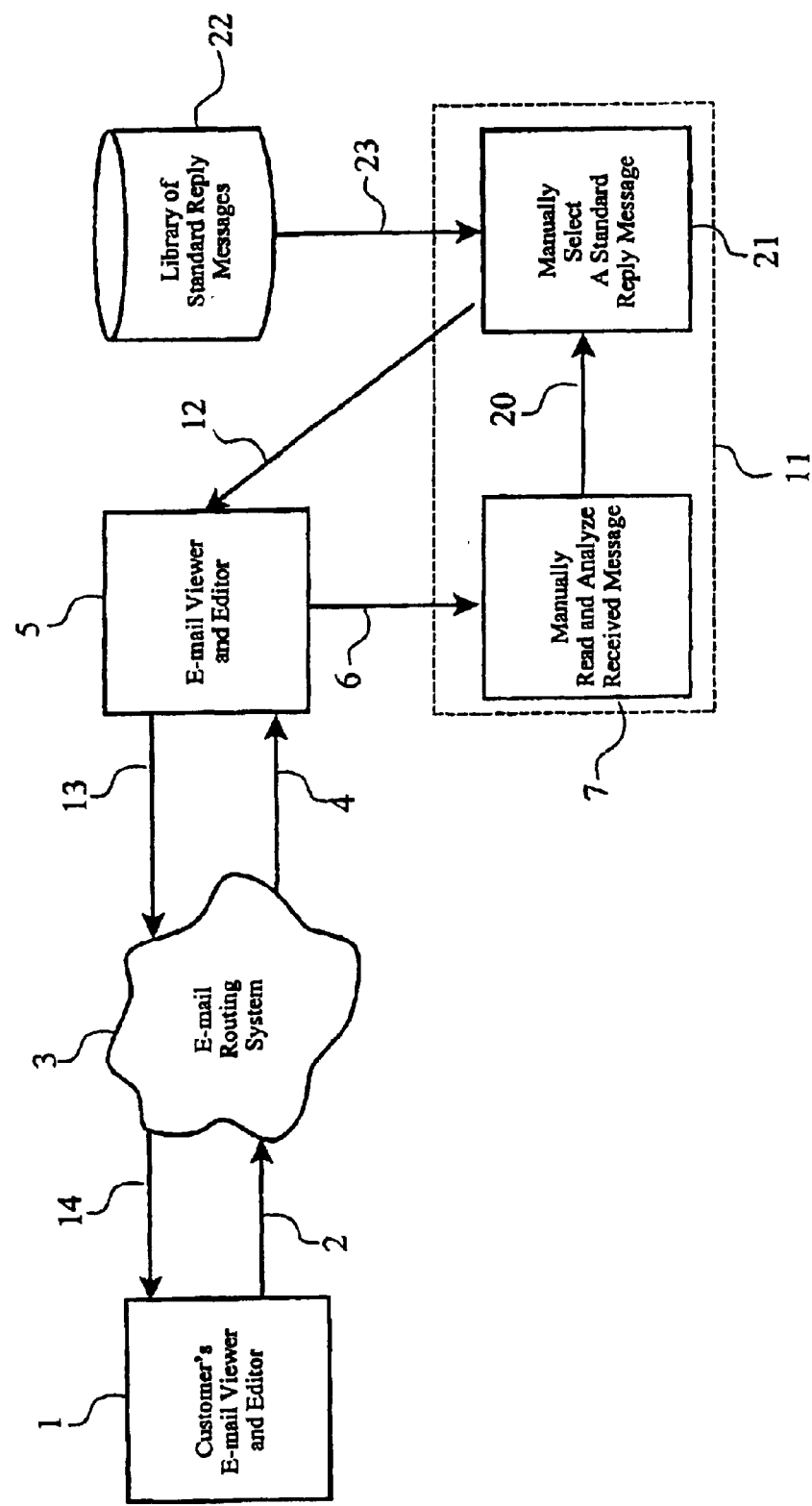
FIG. 2 shows a semi-automated method, both of which are well known within the art.
Figure 3:
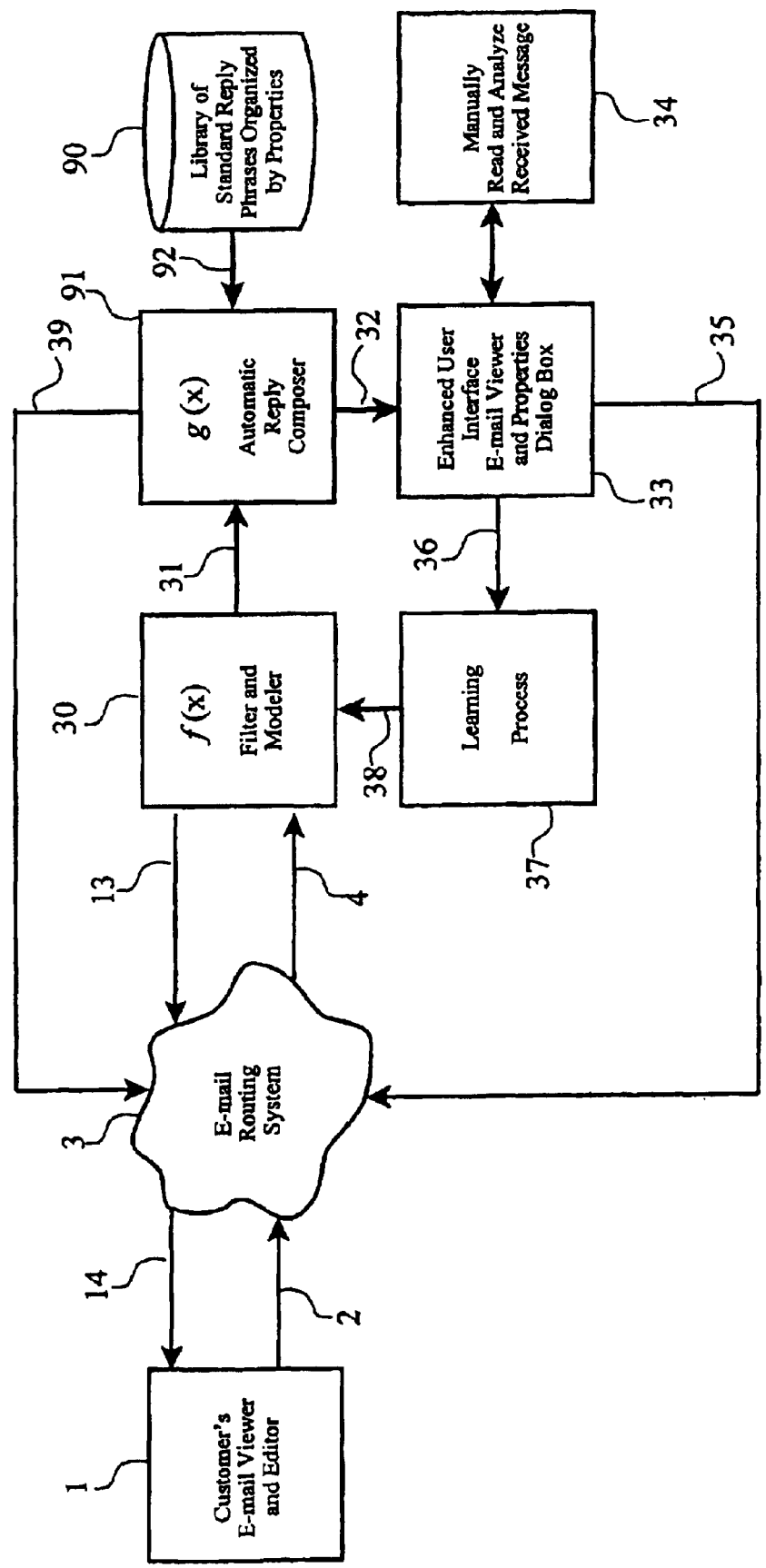
FIG. 3 depicts the system and method of the invention as disclosed herein.

Turning to FIG. 3, a customer may compose and send a message using an e-mail viewer and editor (1), and may send (2) that message to the system using an e-mail routing system (3), which are well known within the art. Preferably, this is an SMTP e-mail servers, but can also be a proprietary e-mail system such as IBM's Lotus Notes system. Alternatively, the customer's message may originate as a written document sent using a facsimile machine, which is then subjected to optical character recognition ("OCR") and converted to a text-based electronic message.

The message is then received (4) into a filter and modeler (30). The reception means may be via file transfer over a network, such as the Internet or a Local Area Network, or may be by interfacing to a database in which the electronic messages are stored, such as an ODBC interface.

The filter and modeler (30) performs language analysis and characterization of the content of the text message, as described in the parent patent application, yielding a tagged message (31) which indicates the attitude of the customer (positive, negative, or neutral), the issue(s) or request(s) presented in the message, the profile of the customer and an estimate of his education level. The techniques employed by the filter and modeler (30) are more fully described in the aforementioned parent application. They include feature extraction methods, which can be any one or multiple methods of pattern recognition, such as keyword analysis, morphology, natural language processing, thesauri, co-occurrence statistics, syllabic analysis and word analysis. The feature extraction methods result in several output signals, including keyword frequencies, co-occurrence statistics, a dimensionally-reduced representation of the keyword frequencies, phoneme frequencies, structural pattern statistics for sentences, paragraphs, and pages, estimated education level of the author based on word choices and complexity of sentence structure, and customer type.

This tagged message (31) is received by an automatic reply composer (91) using the same transfer mechanisms described for the filter modeler input (4). Based upon the tags, the automatic reply generator (91) retrieves from a library of phrases (90) partial replies or reply phrases (92) for each issue and request presented, introductory phrases based on the attitude of the customer, and may further re-select these replies based on educational level of the customer. For example, TABLE 7 shows a simple, two-issue message received from a customer.

TABLE 7

Example Initial Message

| | |
|---|---|
| To: | customer_service@big_corp.com |
| FROM: | unhappy_customer@an_isp.net |
| SUBJECT: | Please help! |
| MESSAGE: | I have been trying to find a service location for my Model 999, which has now been broken for several months. I just bought it last year, and never expected it to break so soon. I live in Smithville. Also, I never received my rebate in the mail. Please tell me when I can expect that to arrive, too. |

Based on the filter and modeler tag outputs, the phrases "please help!", "for several months", "never expected", and "never" indicate a general negative disposition of the customer. Further, the filter identifies two issues, namely a request for the nearest service location and a request for status on the rebate. So, a preliminary message would be composed by searching the library and concatenating text phrases into a whole message, such as the process shown in TABLE 8.

TABLE 8

Search and Retrieval Process Steps intro_text = Get_intro_phrase(negative)
issue(1) = (service_locations, smithville)
issue(2) = (corp_policies, rebate)
Reply_text = intro_text
For issue_index m = 1 to n:
    issue_text(m) = Get_issue_reply(issue(1))
    Reply_text = Reply_text + issue_text(m)
    Next issue
Reply_text = Reply_text + "If you have further questions, please feel free to contact us again, or call us at 1-800-XYZ-CORP"

An example database of replies is given in TABLE 9, in a comma-separated variable ("CSV") format, which is commonly known within the art of database technologies, in which each carriage return character <CR> signifies the end of a relational record, and each relational record is made up of several fields separated by a comma.

TABLE 9

Example Reply Phrase CSV Database

Tag,Parm1,Parm2,Text Reply
Attitude,Negative,"We apologize for your difficulties."<CR>
Attitude,Neutral,"Thank you for your message."<CR>
Attitude,Positive,"We are pleased to hear from you."<CR>
Issue,corp_policies_refunds,"We do not offer refunds."<CR>
Issue,corp_policies_rebates,"All rebates will be paid after the rebate period expiration date, August 15, 2001."<CR>
Issue,corp_policies,hiring,"We are an equal opportunity employer. Your message has been forwarded to our staffing department."<CR>
Issue,corp_policies,donations,"We regularly support a number of charitable organizations. You message has been forwarded to our community relations department."<CR>
Issue,service_centers smithville,"Your nearest service center is Bob's Hardware, 19 Main Street, Smithville."<CR>
Issue,service_centers chicago"Your closest service center is 1419 Enterprise Blvd., Schaumberg, Il."<CR>

Using this example database and the pseudocode of TABLE 8, a reply would be composed of the text reading:

TABLE 10

Concatenated Text Reply

"We apologize for your difficulties. Your nearest service center is Bob's Hardware, 19 Main Street, Smithville. All rebates will be paid after the rebate period expiration date, August 15, 2001. If you have further questions, please feel free to contact us again, or call us at 1-800-XYZ-CORP."

Figure 4:
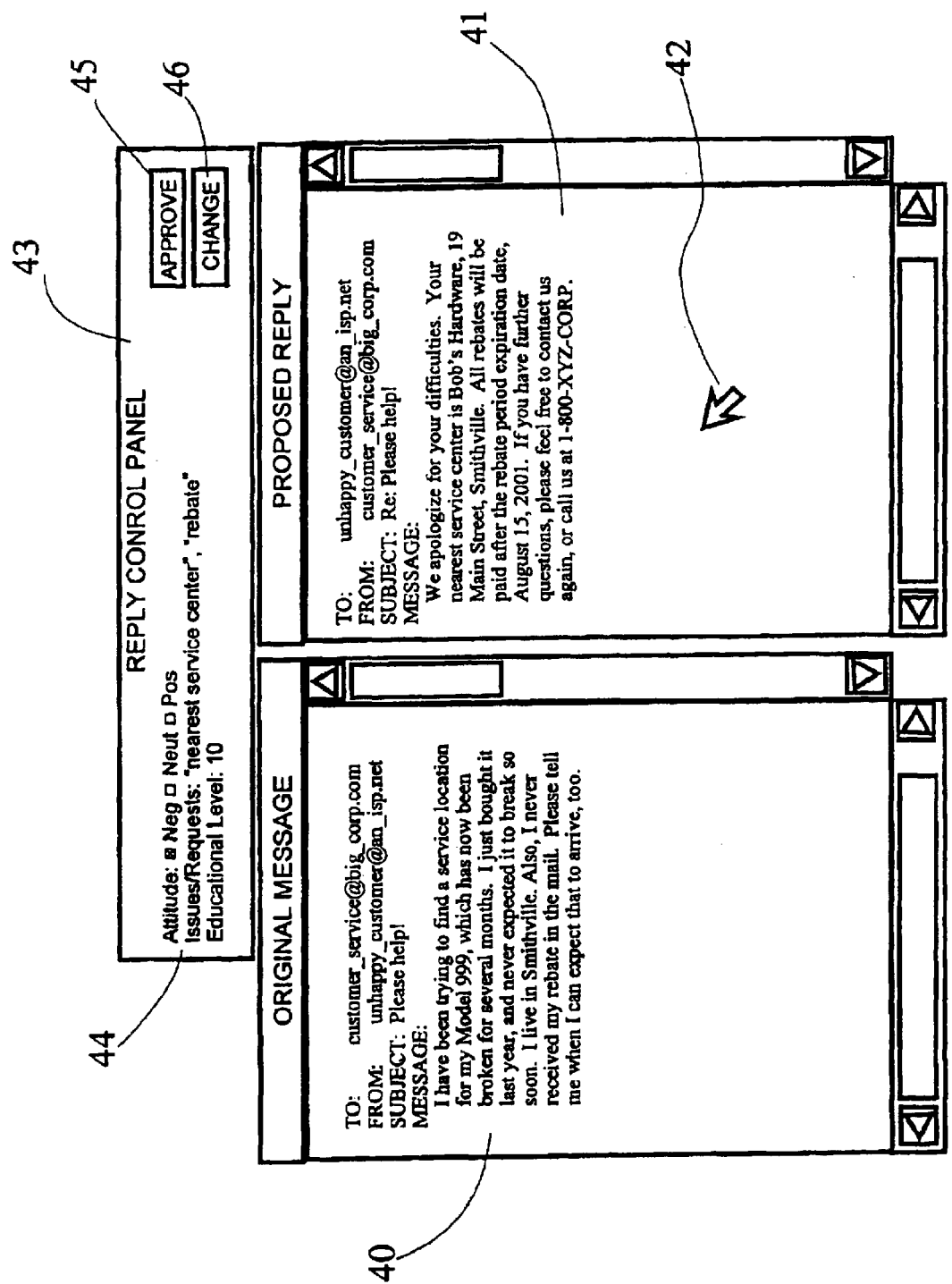
FIG. 4 shows a view of the user interface allowing a human agent to review the original email, the proposed reply, and the tags.

This proposed message is presented (32) to a user via an enhanced user interface (33), with the tags and the original message, as shown in FIG. 4. The user is able to view the original message (40) preferably in a window with the typical left/right and up/down navigation bars, similar to standard e-mail viewers and editors. A second window for the proposed reply (41) allows the user to compare the reply to the original message. A mouse-type cursor (42) is preferably provided, which allows the user to select windows, toggle options and the like, as is common with computer display graphical user interfaces. A control panel (43) is provided in which the user can see the associated tags, and which has at least two options: APPROVE/SEND and is CHANGE. If the user wishes to accept and send the message as proposed, he or she simply "clicks" on the APPROVE button (45). If the system has incorrectly generated a tag, such as the attitude, the user can click on the CHANGE button (46), and then click on the tag to change it.

In either case, the user's selections are received (36) by the learning process (37), as shown in FIG. 3. The learning process updates (38) the adaptive reasoning and analysis logic of the filter and modeler (30) such that future tag generation is more precise.

When the message is ready to be sent, the user simply clicks on the APPROVE button, and the message is transmitted (35) to the customer via the e-mail routing system (3) such that he or she can receive it (14) and view it using his or her e-mail viewer (1).

In an enhanced embodiment of the invention, the proposed replies are automatically composed and transmitted (39) to the customer without the step of manual review. A process of random or statistical selection of the messages by a user can be incorporated into the automatic reply composer such that a user can review and correct proposed replies on a sample basis.

While the invention has been set forth with particular details to the preferred embodiments, those who are skilled in the art will recognize that a number of deviations and changes to the system and method can be made without departing from the spirit and scope of the invention.

What is claimed is:

1. A system for automatic generation and reply to messages in an asynchronous communications system, comprising:

a message reception means for inputting a first electronic text message into the system;

a message natural language filtering and modeling means receiving tile text message from the message reception means, said filtering and modeling means generating a plurality of assigned message characteristics according to natural language analysis of a body portion of the text message, said assigned characteristics indicating factors, including one or more of customer attitude, customer profile, customer education level, and issues presented, upon which a reply will depend, said natural language analysis comprising performing feature extraction to produce a plurality of output signals relating to one or more of keyword frequencies, word co-occurrence statistics, a dimensionally-reduced representation of the keyword frequencies, phoneme frequencies, and structural pattern statistics for any of sentences, paragraphs, and pages; and a message reply composition means receiving said assigned message characteristics, and having an interface for communicating to a reply phrase library database using database queries, and having a proposed text-based reply electronic message output, said message reply composition means performing the following steps to create a grammatically complete, comprehensible and relevant reply electronic message output:

retrieving at least one phrase from said phrase library database for each assigned message characteristic received from said filtering and modeling means;

combining said retrieved phrases into a grammatically complete, comprehensible and relevant reply electronic text message; and outputting the reply electronic text message.

2. The system for automatic generation and reply to messages in an asynchronous communications system of claim 1, further comprising a user interface means which receives said first and second electronic text messages, said tags, and presents them via a computer display.

3. The system for automatic generation and reply to messages in an asynchronous communications system of claim 2, wherein said user interface means further comprises a user input means for allowing a user to change the text within said second electronic text message.

4. The system for automatic generation and reply to messages in an asynchronous communications system of claim 2, wherein said user interface means further comprises a user input means for allowing a user to change the tag values.

5. The system for automatic generation and reply to messages in an asynchronous communications system of claim 4, further conspiring a learning processing means for receiving said user changes to said assigned characteristics via said user interface means, and for automatically updating in real time adaptable parameters within said filtering and modeling means without operator intervention.

6. The system for automatic generation and reply to messages in an asynchronous communications system of claim 1 further comprising and electronic text message transmission means for transmitting said second electronic text message to another destination.

* * * * *

UNITED STATES PATENT AND TRADEMARK OFFICE
CERTIFICATE OF CORRECTION

PATENT NO. : 6,718,368 B1
DATED : April 6, 2004
INVENTOR(S) : V.A. Shiva Ayyadurai It is certified that error appears in the above-identified patent and that said Letters Patent is hereby corrected as shown below:

Title page,
Item [57], ABSTRACT,
Line 14, delete "is".

Column 8,
Line 11, replace "tile" with -- the --.
Line 65, replace "and" with -- an --.

Signed and Sealed this

Twenty-first Day of September, 2004

JON W. DUDAS
*Director of the United States Patent and Trademark Office*